(12) United States Patent
Sugiyama

(10) Patent No.: US 6,285,148 B1
(45) Date of Patent: Sep. 4, 2001

(54) ENERGIZATION CONTROL DEVICE FOR ELECTRIC MOTOR

(75) Inventor: Masanori Sugiyama, Aichi-ken (JP)

(73) Assignee: Aisin Seiki Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 09/536,145

(22) Filed: Mar. 28, 2000

(30) Foreign Application Priority Data

Mar. 31, 1999 (JP) .................................................. 11-091828

(51) Int. Cl.[7] ............................................................ H02P 7/00
(52) U.S. Cl. ............................ 318/432; 318/254; 318/434; 318/701; 318/721
(58) Field of Search ..................................... 318/254, 432, 318/701, 721, 599, 638, 434

(56) References Cited

U.S. PATENT DOCUMENTS

| 5,282,401 | * | 2/1994 | Hebbale et al. ........................ 74/866 |
| 5,747,962 | * | 5/1998 | Fulton ................................... 318/701 |
| 5,754,024 | * | 5/1998 | Sugiyama .............................. 318/701 |
| 6,051,942 | * | 4/2000 | French ................................... 318/254 |

* cited by examiner

Primary Examiner—Robert E. Nappi
Assistant Examiner—Rita Leykin
(74) Attorney, Agent, or Firm—Sughrue, Mion, Zinn, Macpeak & Seas, PLLC

(57) ABSTRACT

An energization control device for an electric motor includes: a rotor angle sensor for detecting a motor rotational angle; a current sensor for detecting a current flowing through a phase coil; a control data storage device for storing therein a plurality of control data items in map format which correspond to rotational conditions of the rotor; and a control device for controlling the energization of the phase coil. The control device obtains first control data items for deriving a first torque from the motor and second control data items for a second torque, when a target torque is intended to be derived from the motor which is smaller and larger than the first torque and the second torque, respectively. The control device, when establishing an energization control for deriving the target torque from the motor, uses the first control data item and the second control data item in such a manner that a ratio of the second control data item to the first control data item is the ratio of a first deviation between the first torque and the target torque to a second deviation between the target torque and the second torque.

6 Claims, 9 Drawing Sheets

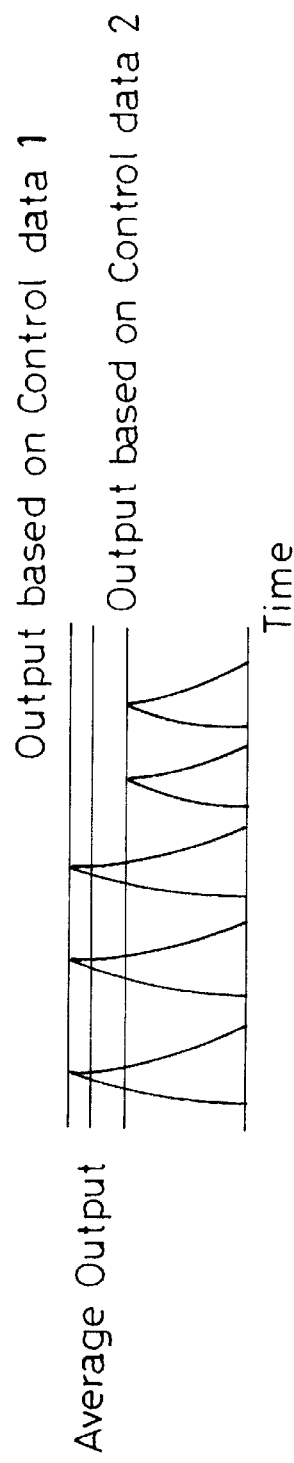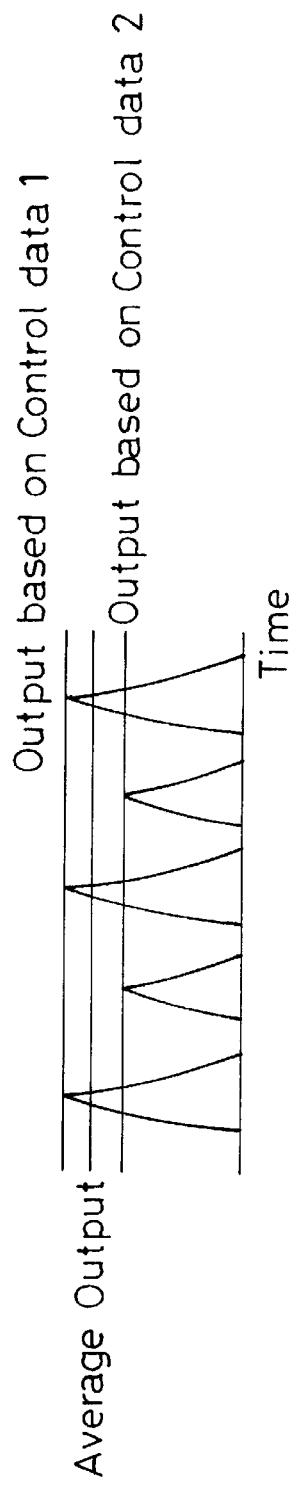

ENERGIZATION CONTROL DEVICE FOR ELECTRIC MOTOR

BACKGROUND OF THE INVENTION

The present invention is directed to an energization control device for an electric motor and in particular to a chopping control device of a switched reluctance motor which is driven such that switching the energization for each of the phase coils is made.

In electric motors, particularly switched reluctance motors (SR motors), for controlling the amount or level of current which flows through a load or phase coil, an H-type switching circuit is used as disclosed in Japanese Patent Laid-open print No. Hei.8-172793 published without examination in 1996. In the conventional electric motor device, the H-type switching circuit is interposed between the phase coil and a DC power supply and the actual current flowing through the phase coil is measured by using a resistor. The resultant current is compared to the target current in binary mode and the H-type switching element is turned on and turned off when the target current ≧ the actual current and the target current < the actual current, respectively. Thus, repeating the tuning on and off the switching element in alternative fashion changes the actual current flowing through the phase coil, thereby adjusting the actual current to the target current as precise as possible.

In the conventional motor, controlling the output torque, the rotational number, and the current flowing through the phase coil is established by the switching element. On the other hand, a control data map is prepared inside a microprocessor which is made up of a plurality of control data items and one of the control data items is selected for energizing the motor. Each of the control data items includes an ON-angle at which the switching element is turned on, an OFF-angle at which the switching element is turned off and a target current. The larger the number of the control data items (or the higher the resolving power of the data), the more precise the control of the motor.

However, such a resolving power is limited. On the other hand, the output of the motor depends on the resolving power of the ON-angle/OFF-angle. For example, within a range of intermediate-high speed of 5000 rpm or above, according to the motor characteristics, though the current flowing through the phase coil is increased in a gradual manner after the angular position of the rotor passes the ON-angle, the angular position of the rotor reaches the OFF-angle, which sometimes causes turning off the switching element before the actual current reaches the target current. In this case, for example, advancing the ON-angle by the minimum resolution power, a several percent increase of the output of the motor is attained. However, in an intermediate range between the advanced ON-angle and the original ON-angle, it is impossible to change the output of the motor or the torque derived from the motor.

In view of the foregoing circumstances, a need exists to establish an optimum control of the motor in such a manner that the output of the motor coincides with the target output of the motor without improving the resolution power.

SUMMARY OF THE INVENTION

It is, therefore, a principal object of the present invention to provide an improved energization control device for an electric motor which satisfies the need noted above.

In order to attain the foregoing object, the present invention provides an energization control device for an electric motor which is comprises (a) detecting means for detecting an angle of rotation of a rotor of the motor, (b) control data storage means for storing therein a plurality of control data items corresponding to rotational conditions of the rotor, and (c) control means for controlling the energization of the motor, the control means obtaining first control data items for deriving a first torque from the motor and second control data items for a second torque, when a target torque intended to be derived from the motor is smaller and larger than the first torque and the second torque, respectively, the control means, when establishing an energization control for deriving the target torque from the motor, using the first control data items and the second control data items in such a manner that a ratio of the second control data items to the first control data items is the ratio of a first deviation between the first torque and the target torque to a second deviation between the target torque and the second torque.

In accordance with the present invention, based on the deviation ratio, the weighted average of the first control data item and the second control data item makes it possible to derive an intermediate torque from the motor which lies between the first torque and the second torque, with the result that a more precise control of energizing the phase coil of the motor is possible using the conventional control data map.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which;

FIGS. 10a and 10b illustrates waveforms when the signal S1 is switched.

DETAILED DESCRIPTION OF THE PRESENT INVENTION

A preferred embodiment of the present invention will be described hereinafter in detail with reference to the accompanying drawings.

Figure 1:
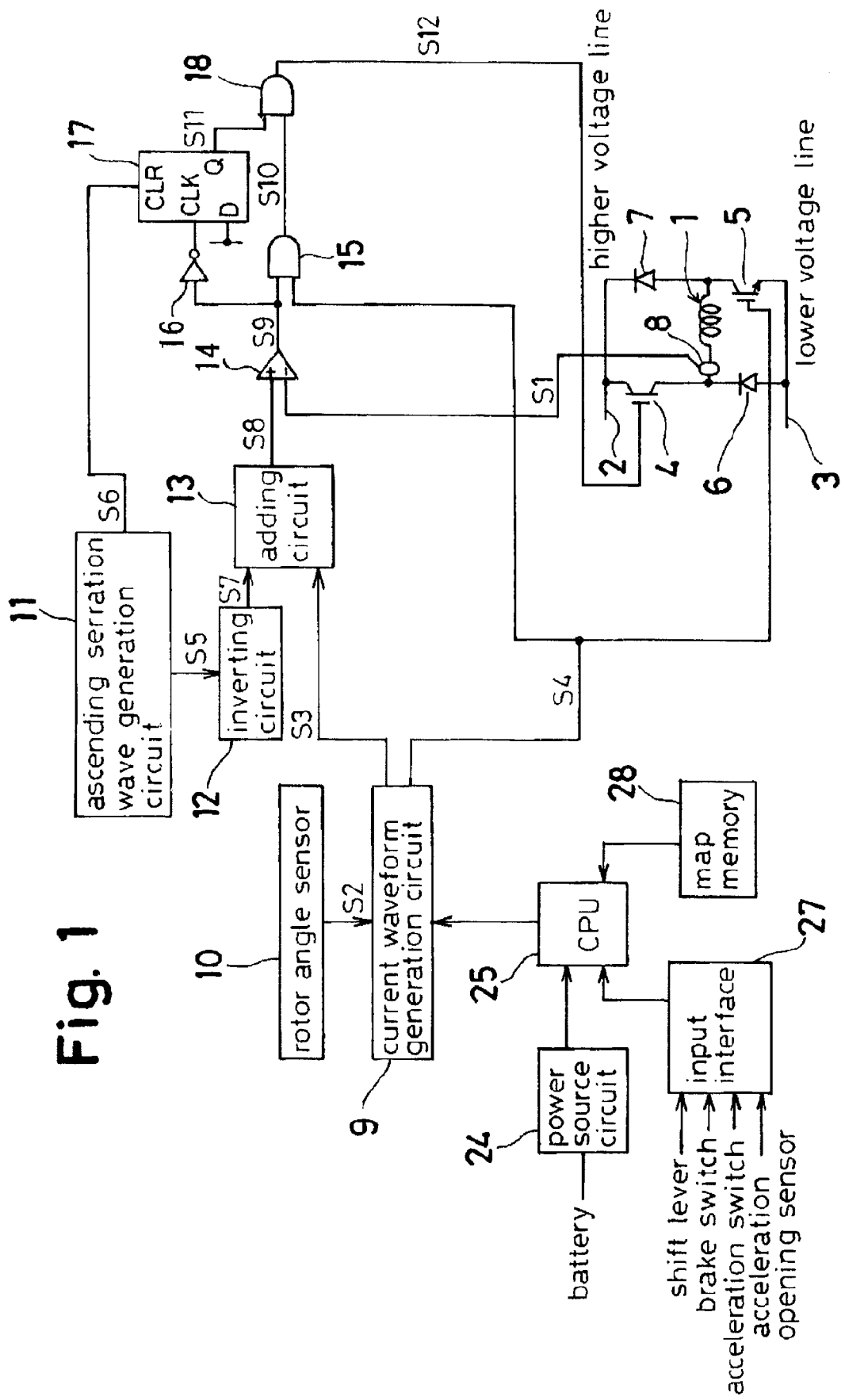
FIG. 1 illustrates a block diagram of an energization controller for an electric motor which is in the form of a three-phase switched reluctance motor.

First of all, with reference to FIG.1, there is illustrated a block diagram of an energization controller CON for a three-phase switched reluctance motor (not shown) which is mounted, as a driving means, on an electric automotive vehicle (not shown). The energization controller CON is made up of a first switching element 4 which is disposed between one end of the phase coil 1 and a higher voltage line 2 of a power source (not shown), a second switching element 5 which is disposed between the other end of the phase coil 1 and a lower voltage line 3 of the power source, a first diode 6 which is disposed between one end of the phase coil 1 and the lower voltage line 3 of the power source for allowing only current flow through the phase coil 1 from one end thereof, a second diode 7 disposed between the other end of the phase coil 1 and the higher voltage line 2 for allowing only current flow thereto, and a current sensor 8 which is disposed between the first switching element 4 and the phase coil 1 for generating an analogue signal S1 representing an actual amount of current which passes through the phase coil 1. Each of the switching elements 4 and 5 is in the form of an insulating gate bipolar type transistor (IGBT).

The energization controller CON includes a CPU or microprocessor 25 which is provided with a constant voltage of 5 volts by way of a power source circuit or unit 24 from a vehicle-mounted or on-vehicle 12V battery. The CPU 25 is in receipt of signals, by way of an input interface 27, from a shift lever, a brake switch, an acceleration switch, and an acceleration opening sensor. The CPU 25 is provided with an inner map memory 28 which is replaceable with an outer map memory. In the map memory 28, a plurality of data are stored as motor control data. On the basis of the read-out motor control data, the CPU 25 issues a signal to a waveform generation circuit 9.

On the basis of a digital signal S2 from a rotor angle sensor 10 which is mounted on a rotor shaft (not shown) for determining a rotational angle or angular position of the rotor of the switched reluctance motor, the waveform generation circuit 9 issues an analogue signal S3 which represents a criteria current amount corresponding to the rotor angular position. In addition, the waveform generation circuit 9 issues a binary or two-digit signal S4 which remains HIGH and LOW while the rotor angular position corresponding to an activation and a relaxation of the phase coil 1, respectively. The criteria amount of current corresponding to the rotor angular position, the rotor angular position corresponding to the time when the phase coil 1 is activated, and the rotor angular position corresponding to the time when the phase coil 1 is relaxed are set by the CPU 25 upon receiving outside instruction of the operation of the switched reluctance motor.

An ascending serration waveform generation circuit 11 generates an analogue ascending serration waveform signal S5 whose cycle and amplitude are constant and a criteria chopping timing signal S6 which is in synchronization with the signal 5 in cycle. The criteria chopping time signal S6 is in the form of a binary or two-digit signal and remains LOW except that whenever one cycle of the signal 5 terminates, the signal 6 becomes HIGH instantaneously. One cycle of the criteria chopping time signal S6 is set to be identical with one cycle of a frequency which is slightly above the human audible frequency range. An inverting circuit 12 inverts the ascending waveform signal S5 to generate a descending waveform signal S7. An adding circuit 13 generates a corrected criteria current signal S8 by superposing the descending waveform signal S7 on the signal S3.

A comparison circuit 14 makes a comparison between the signal S1 and the corrected criteria current signal S8 and issues a binary or two-digit signal S9 which represent HIGH and LOW when the signal S1 is lower than the signal S8 and the signal S1 is equal to or greater than the signal S8, respectively.

The binary signal S9 is inputted to one of the input terminals of an AND-gate 15 and is fed to an input terminal CLK of a flip-flop 17 after being inverted by an inverter 16. The other input terminal of the AND-gate is inputted with the signal S4. The signal S4 is also fed to the second switching element 5 such that if the signal S4 is in HIGH and LOW the second switching element 5 is in the ON condition (being closed) and OFF condition (being opened), respectively.

One of input terminals of an AND-gate 18 is inputted with a binary signal S10 which is outputted from the AND-gate 10, while the other input terminal of the AND-gate 18 is inputted with a signal S11 which is outputted from an inverting output terminal of the flip-flop 17. The other input terminal CLR of the flip-flop 17 is inputted with the criteria chopping signal S6. In response to the falling of the signal S9, the condition of the binary signal S11 from the inverting output terminal of the flip-flop 17 changes from HIGH to LOW, while in response to the rising of the signal S9, the condition of the binary signal S11 from the inverting output terminal of the flip-flop 17 changes from LOW to HIGH. 15 While the signal S11 is in HIGH condition, a binary signal S12 which is issued from the AND-gate 18 becomes HIGH and LOW if the condition of binary signal S10 is HIGH and LOW, respectively. If the binary signal S12 is inputted to the first switching element 4 in such a manner that the binary signal S12 is in HIGH and LOW condition, the first switching element 4 is closed and opened, respectively. While the signal S11 is in HIGH condition, in response to the change of the signal S10 from HIGH condition to LOW condition (from LOW condition to HIGH condition), the condition of the signal S12 becomes LOW from HIGH (HIGH from LOW). However, while the signal S11 is in LOW condition, even if the signal S10 changes from LOW to HIGH, the condition of signal S12 remains LOW.

It is to be noted that the amplitude VP of the voltage of the signal S5 is set to be equal to or less than an offset voltage of a signal S1 issued from the current sensor which is defined as the voltage when the actual current flowing through the phase coil 1 is zero.

An operation of the device shown in FIG. 1 is described in detail with reference to FIGS. 1 and 2. If the rotation angle of the rotor or the angular position of the rotor coincides with the On-angle at which the activation of the phase coil 1 is initiated, the condition of the signal S4 is changed from LOW to HIGH, thereby turning on the second switching element 5. By contrast, if the rotation angle of the rotor or the angular position of the rotor coincides with the OFF-angle at which the relaxing of the phase coil 1 is initiated, the condition of the signal S4 is changed from HIGH to LOW, thereby turning off the second switching element 5. While the second switching element 5 is in closed condition, if the first switching element 4 is closed and opened, a current supply from the power supply to the phase coil 1 is established and interrupted, respectively.

On the other hand, while the angular position of the rotor is in the course of travel from the ON angle to the OFF angle, whenever the rotational angle of the rotor changes which is detected by the rotor angle sensor 10, the level of the signal S3 changes to the level which represents the criteria current value which correspondes to the rotational angle of the rotor. If the rotational angle of the rotor is in a position before the ON angle, the level of the signal S3 is zero and the amplitude VP of the signal S5 is equal to or less than the offset voltage of the signal S1, so that the level of the signal S1 remains larger than the level of the corrected criteria current signal S8 which is obtained by superposing the signal S3 on the descending serration waveform signal S7, whereby the signal S9 remains in LOW condition or level. At the moment of initiation of the activation of the phase coil 1, the level of the signal S3 increases, whereby the actual current signal S1 becomes less than the corrected criteria current signal S8, thereby changing the signal S9 from LOW condition to HIGH condition, with the result that the signal S10 is changed from LOW condition to HIGH condition. The condition change of the signal S9 from LOW to HIGH fails to affect the output signal S11 of the flip-flop 17 and the signal S11 is in LOW condition which results in the signal S12 also being in LOW condition. Immediately upon receiving the criteria chopping timing T1, the signal S11 is turned from LOW level to HIGH level, so that the condition of the respective input terminals of the AND-gate 18 become HIGH, thereby changing the condition of the signal 12 from the AND-gate from LOW to HIGH. Thus, the first switching element 4 is closed or turned on, thereby establishing the current supply to the phase coil 1.

If the level of the signal S1 exceeds the level of the corrected criteria current signal S8 as a result of an increase of the actual current flowing through the phase coil 1, the signal S9 is switched from HIGH condition to LOW condition, which causes changing the condition of the signal S11 from LOW to HIGH which is outputted from the flip-flop 17. Thus, the signal S12 is changed from HIGH condition to LOW condition, thereby turning off the first switching element 4, with the result that the current supply to the phase coil is interrupted. In spite of the turning-off of the first switching element 4 for a while, the rising current continues to flow thorough the phase coil 1 until the perfect closure of the first switching element 4 is established. After the perfect closure of the first switching element 4, the current flowing through the phase coil 1 begins to decrease and if the resultant current falls below the level of the signal S8, the signal S9 changes from LOW condition to HIGH condition. If such a change is made before the criteria chopping timing T2, due to the fact that the signal S11 is in LOW condition, the signal S12 fails to change from LOW condition to HIGH condition, with the result that the closed state of the first switching element remains unchanged. Immediately upon reaching the criteria chopping timing T2, the condition of the signal S11 changes from LOW to HIGH, whereby both of the input terminals of the AND-gate 18 become HIGH in condition, which results in the condition of the signal S12 being switched from LOW to HIGH. Thus, the first switching element 4 is turned on, the current application to the phase coil 1 established, thereby increasing the amount of the current flowing through the phase coil 1 again. Thereafter, when the signal S1 exceeds the signal S8, the signal S9 is switched from HIGH condition to LOW condition, thereby changing the condition of the signal S11 from HIGH to LOW.

Figure 2:
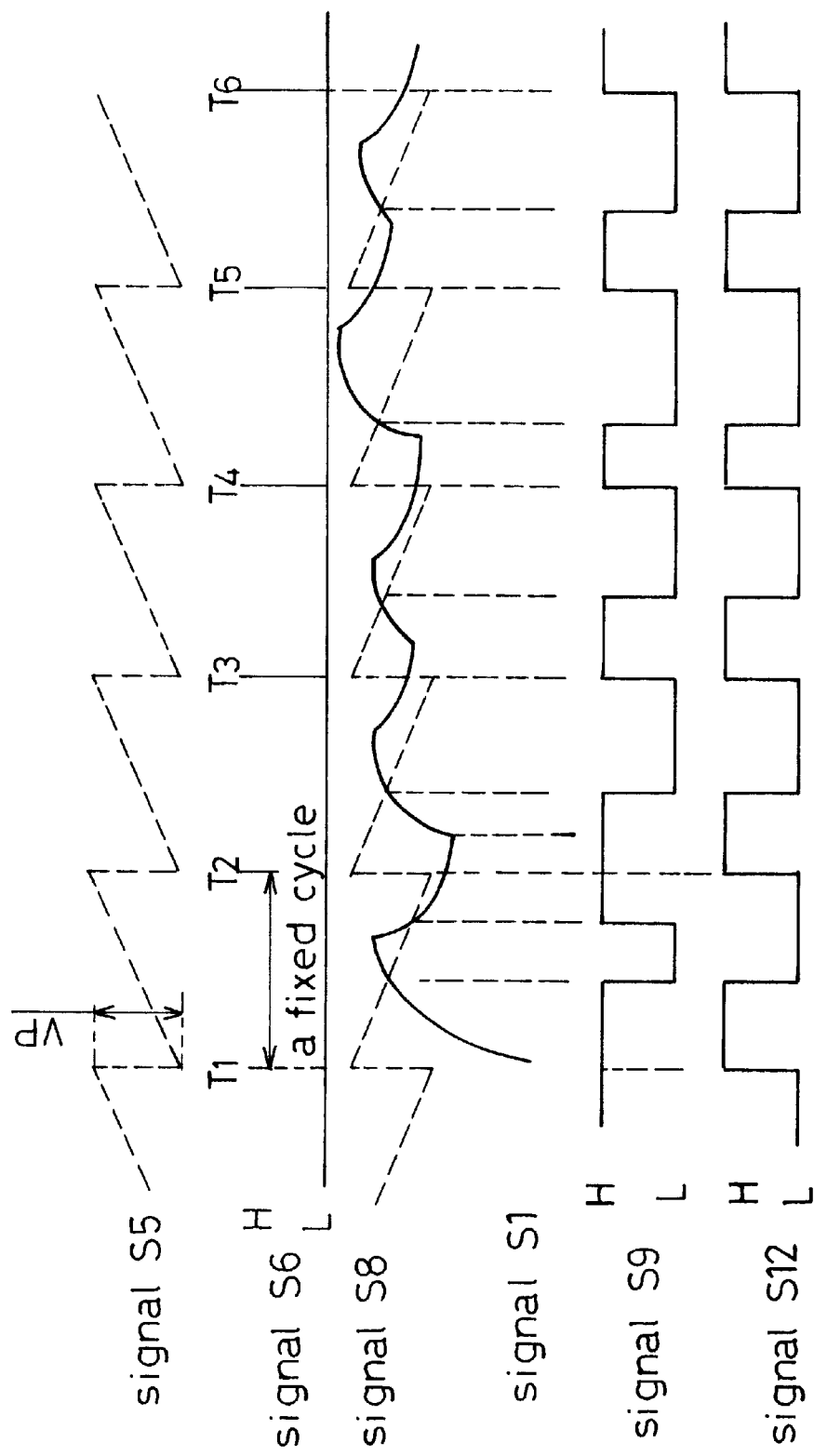
FIG. 2 illustrates time-charts of signals.

As shown in FIG. 2, due to the fact that the corrected criteria current signal S8 is obtained by superposing the descending serration waveform signal S7 on the criteria current signal S3, the corrected criteria current signal S8 increases by a level VP instantaneously only when each of the criteria chopping timings T1, T2, T3, T4, T5, T6 occur. Thus, upon the occurrence of each of the criteria chopping timings T3, T4. T5, T6, even when the signal S8 exceeds the signal S3, if the resultant difference is less than VP, the condition of the signal S9 changes from HIGH to LOW, thereby changing the condition of the is signal S11 from LOW to HIGH, which causes the signal S12 to change from LOW condition to HIGH condition, with the result that the first switching element 4 is closed. Thus, one cycle of on/off activation of the phase coil 1 is so restricted as not to be longer than one cycle of the criteria chopping timing, thereby suppressing generation of noise.

Next, the operation of the CPU 25 which performs the aforementioned chopping energization control will be described. When the CPU 25 receives a current from the on-vehicle battery by way of the power supply circuit 24 subsequent to turning-on an ignition switch (not shown), the CPU 25 begins to start a programmed operation according to the flowchart shown in FIG. 3. First of all, in step S101, an initialization is made. In the initialization, RAMs, ROMs, and other components are checked, initial values are set which are required in the programmed operation, and a check is made whether or not the entire system is ready for normal operation. In the next step or step S102, it is checked whether or not a time duration of 10 microseconds has elapsed which is an operation cycle of the main routine. If the result is yes, step 103 and other subsequent steps are executed.

In step S103, the signals from the shift lever, the brake switch, the acceleration switch, and the acceleration opening sensor are fed to the CPU 25 by way of the input interface 27 and are stored in respective memory areas in the CPU 25. Simultaneously, the signals from the current sensor 8 and similar current sensors (not shown) for two other phase coils (not shown) and the corresponding amounts of current are also stored in the memory areas in the CPU 25.

Figure 7A:
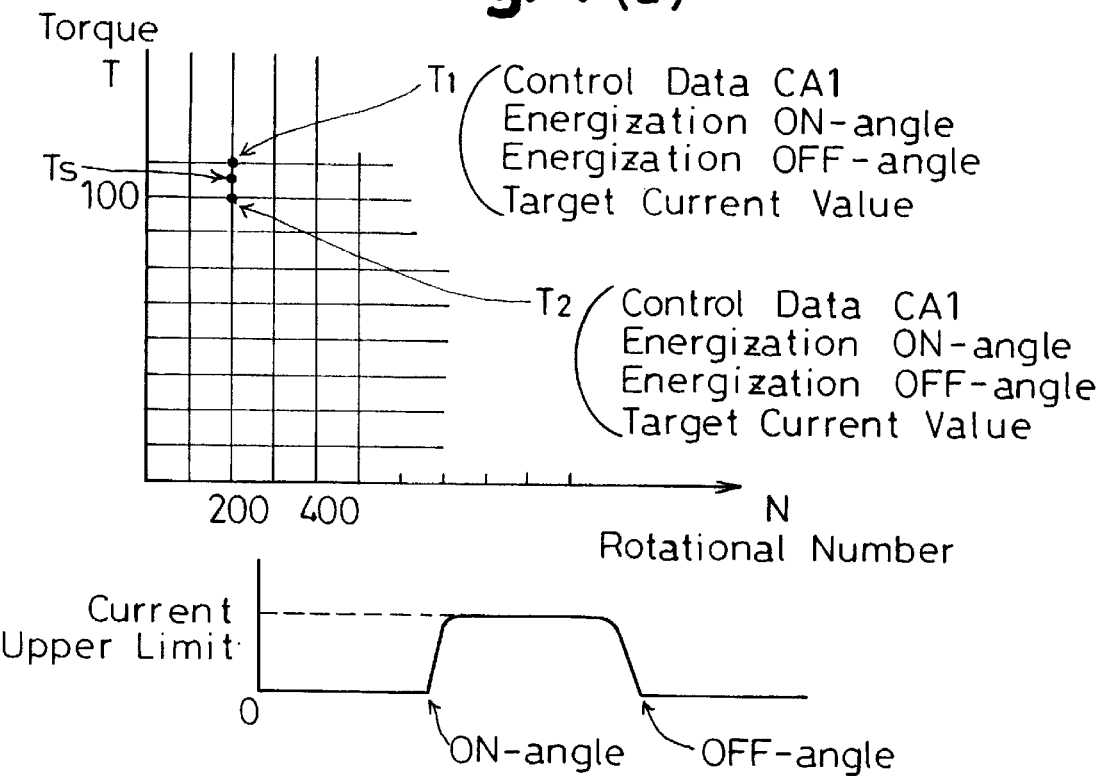
FIGS. 7a and 7b illustrate the concept of a map which indicates a relationship between a rotational number and a torque.
Figure 7B:
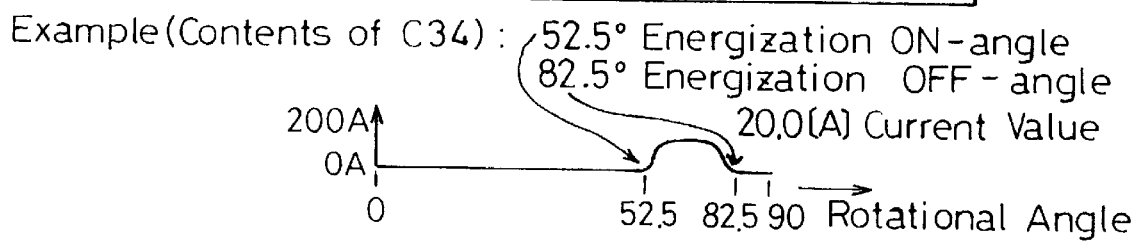

In step S104, a torque calculation is made. In detail, a map is prepared in the CPU 25 which indicates a relationship between the acceleration opening and a target torque Ts. The target torque Ts is in the form of an increasing one-value or one-dimensional function of the acceleration opening in view of the signal from the shift lever, as a parameter, which indicates one of D-range, R-range, First-range, Second-range, and so on. On the basis of the calculated target torque Ts, the amount of energization is determined. Thereafter, at step S105, a map retrieval is made using a map stored in a memory 28. As shown in FIG. 7($a$), in the map the torque T is increased in increments of 5 Nm and the motor rotational number is increase in increments of 100 rpm. The intersection of the motor rotational number and the torque provides a control data which consists of ON-angle, OFF-angle, and an indication of current which is to flow through the phase coil 1. The map is in the form of a dotted grid mode.

Figure 5:
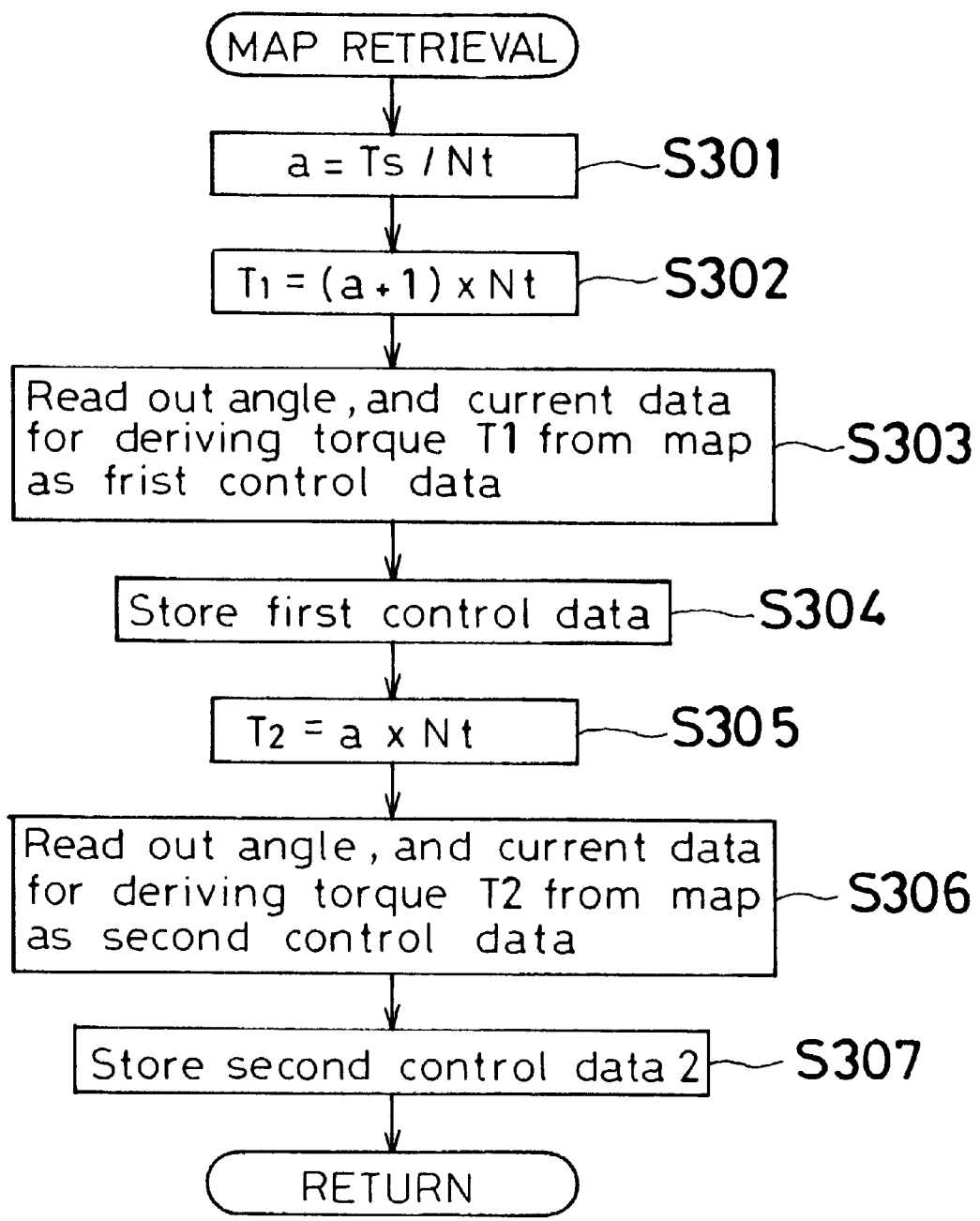
FIG. 5 illustrates a flowchart for a map search.

The map retrieval is made according to the flowchart shown in FIG. 5. At step S301, a rounded integer 'a' is calculated by dividing the target torque Ts by the torque increment or resolving power Nt (5 Nm). The integer 'a' is indicative of the number of the grid points of the map shown in FIG. 7($a$). In step S302, a torque T1 is calculated by the formula of T1=(a+1) X Nt. The thus obtained torque T1 is indicative of a torque that is closest to and is larger the target torque Ts. This means that the torque T1 is on the grid point which is positioned just above the point on which the target torque Ts is placed. From the map, the set of the ON-angle, the OFF-angle, and the indication of current which is to flow through the phase coil 1 is read out which corresponds to the torque T1 and is stored in the memory for later use as a first control data CA1.

In the next step S305, a torque T2 that is closest to and is smaller the target torque Ts is obtained from the grid points. The selected point is located just below the target torque Ts. Then, in step S306, from the map, the set of the ON-angle, the OFF-angle, and the indication of current which is to flow through the phase coil 1 is read out which corresponds to the torque T2 and is stored in the memory for later use as a second first control data CA2. That is to say, the control data CA2 is used to derive the torque from the SR motor.

Figure 8:
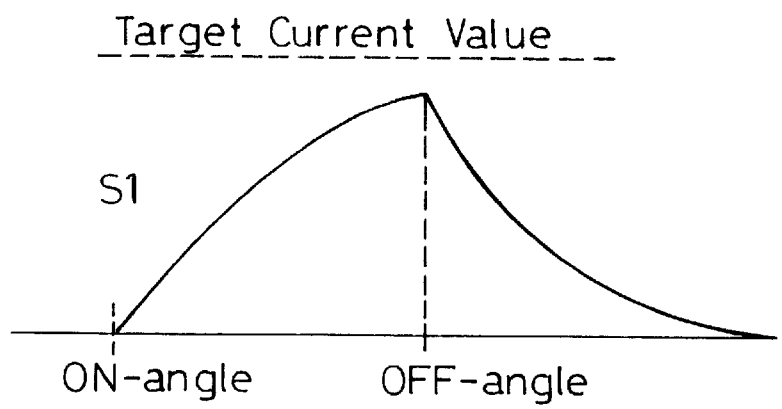
FIG. 8 illustrates a waveform of a signal S1 shown in FIG.1.
Figure 9:
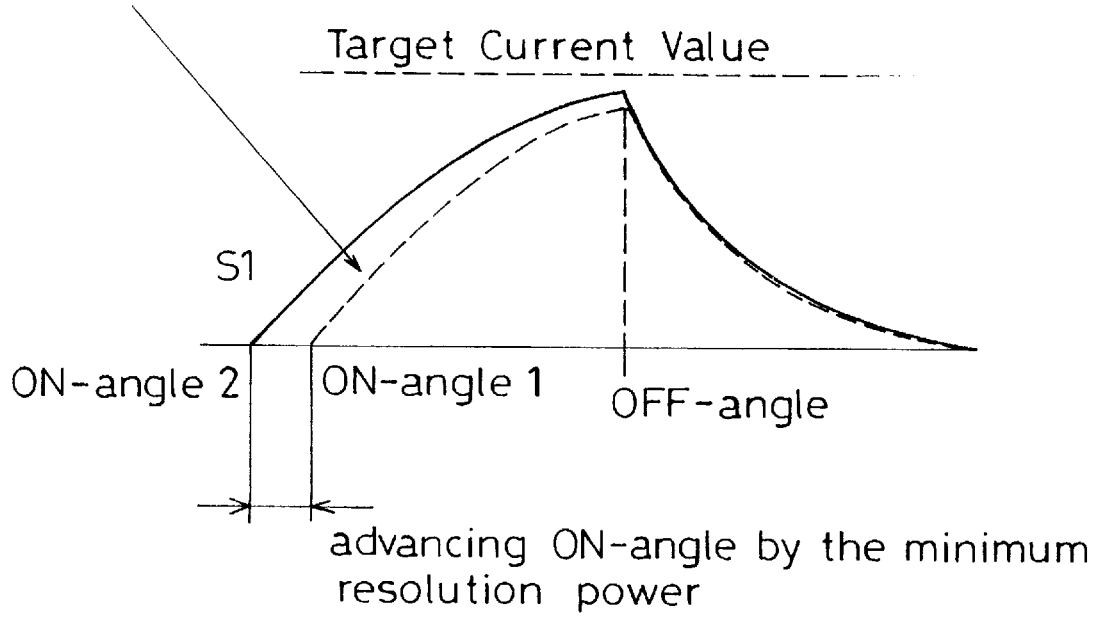
FIG. 9 illustrates a condition when an ON-angle of a wave of the signal S1 is shifted through the minimum resolving power.

For example, in the case where the target torque Ts is 103 Nm and the minimum resolving power Nm is 5 Nm, 'a', when rounded, becomes 20 (103/5). At this time, T1=(20+ 1)×5=105 Nm. The corresponding control data CA1 which derives the torque T1 from the SR motor is stored in the memory. On the other hand, T2=20×5=100 Nm. The corresponding control data CA2 which derives the torque T2 from the SR motor is stored in the memory. The first control data CA1 has a current waveform shown in FIG. 8, while the second control data CA2 has a current waveform shown in FIG. 9 which differs from the current waveform of the control data CA1 in that the ON angle advances by the minimum resolution power.

Figure 3:
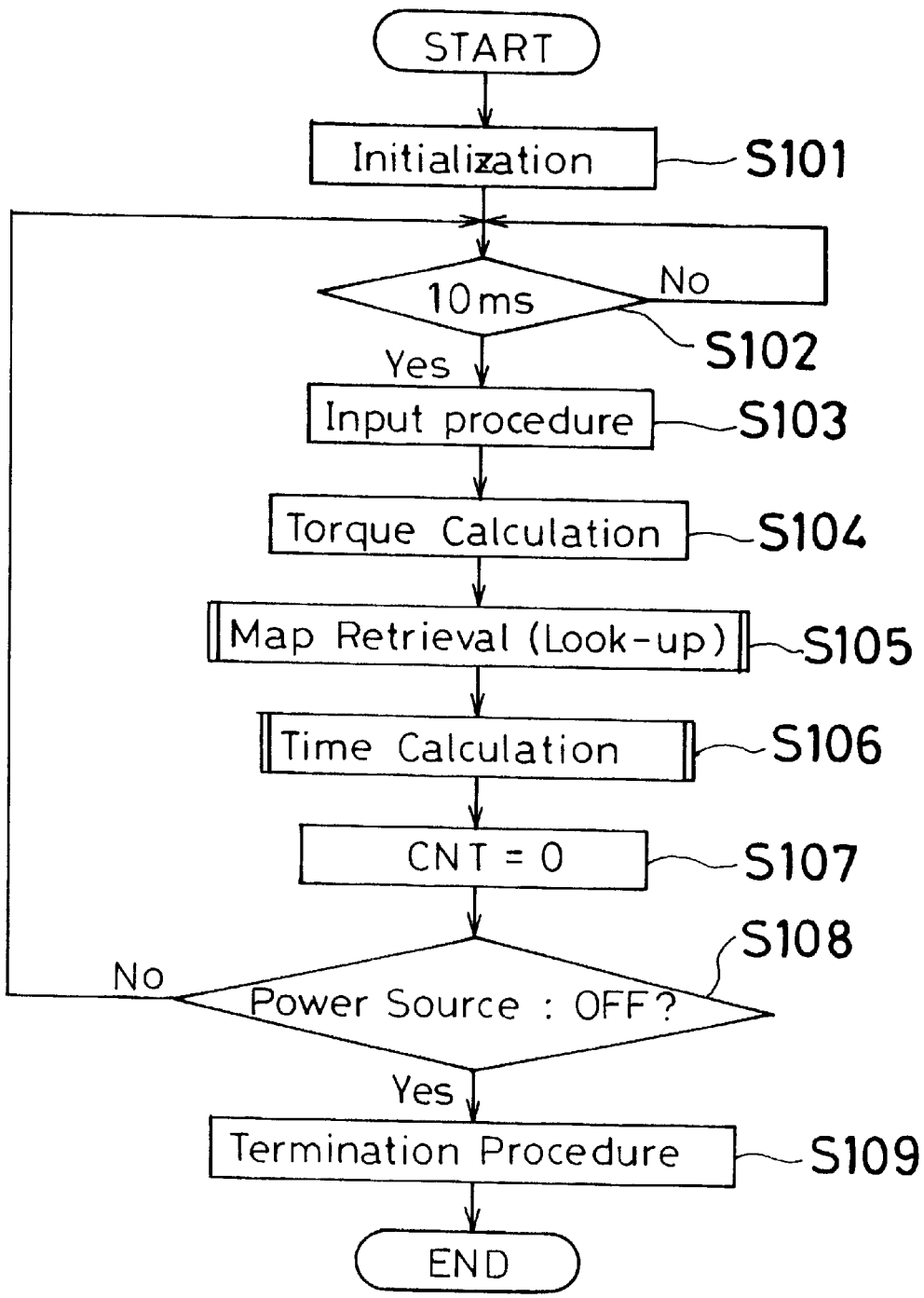
FIG. 3 illustrates a flowchart which offers a main control of a CPU of the energization controller shown in FIG.1.

Thereafter, the program control returns to the main routine shown in FIG. 3 to execute step S106 for time calculation. In this time calculation, the following formula is used.

$$TIME=10(Ts-T2)/(T1-T2)$$

In step S107, a switching counter CNT is cleared or made zero. In step S108, it is checked whether or not the power supply is turned off. If the result is yes or negative, steps S102 through S108 are executed repeatedly. If the power supply is turned off wherein the current supply to the CPU 25 is interrupted, step S109 is executed to stop the SR motor by terminating the order for the energization thereof.

In detail, due to the fact that when the target torque Ts is 103 Nm it is impossible to obtain a control data corresponding thereto directly from the map resolving power (FIG. 7) whereby an indirect calculation of this control data is required. As previously explained, in the map, on the nearest upside grid point and the nearest downside grid point, the torque T1 and the torque T2 are located. Each of the torques T1 and T2 has its own control data. Thus, the control data corresponding to the target torque Ts can be obtained by quasi-interpolation, that is to say, from the map and the above numerical examples, the absolute value of a deviation between the torque T2 and the target torque Ts is 2 Nm, while the absolute value of a deviation between the torque T2 and the target torque Ts is 3 Nm. The ratio of the former deviation to the latter deviation is 2:3 Thus, the control data CA1 is outputted two times and subsequently the control data CA2 is outputted three times to the current waveform circuit 9. The details of this procedure are illustrated in the form of the flowchart shown in FIG. 4.

Figure 4:
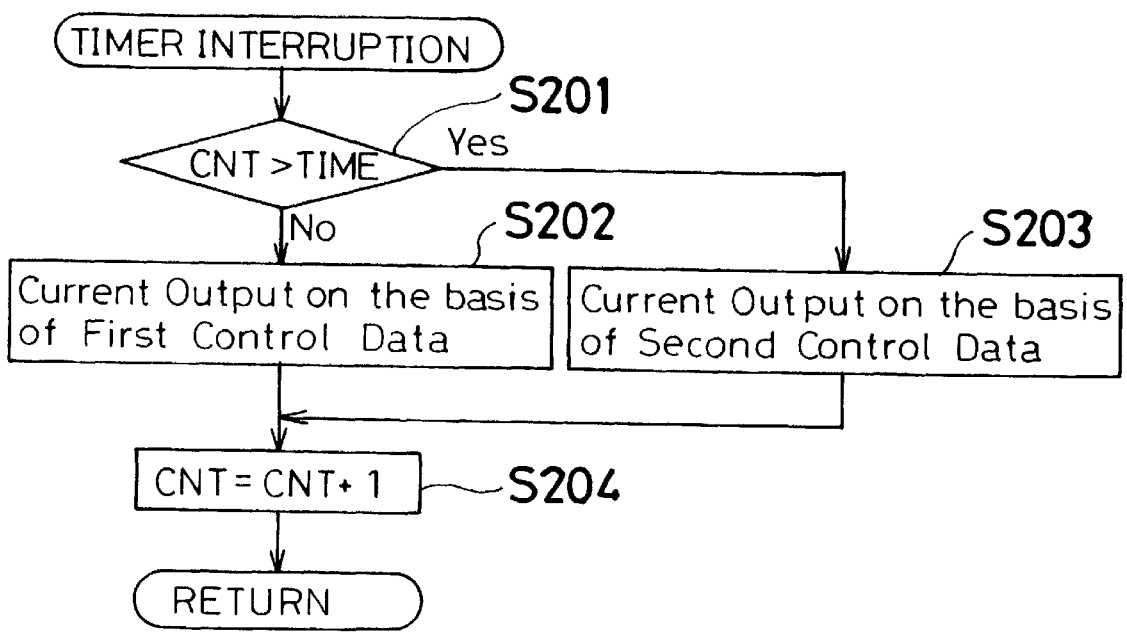
FIG. 4 illustrates a flowchart which offers an interruption procedure in the CPU of the energization controller shown in FIG. 1; for a map search.
Figure 6:
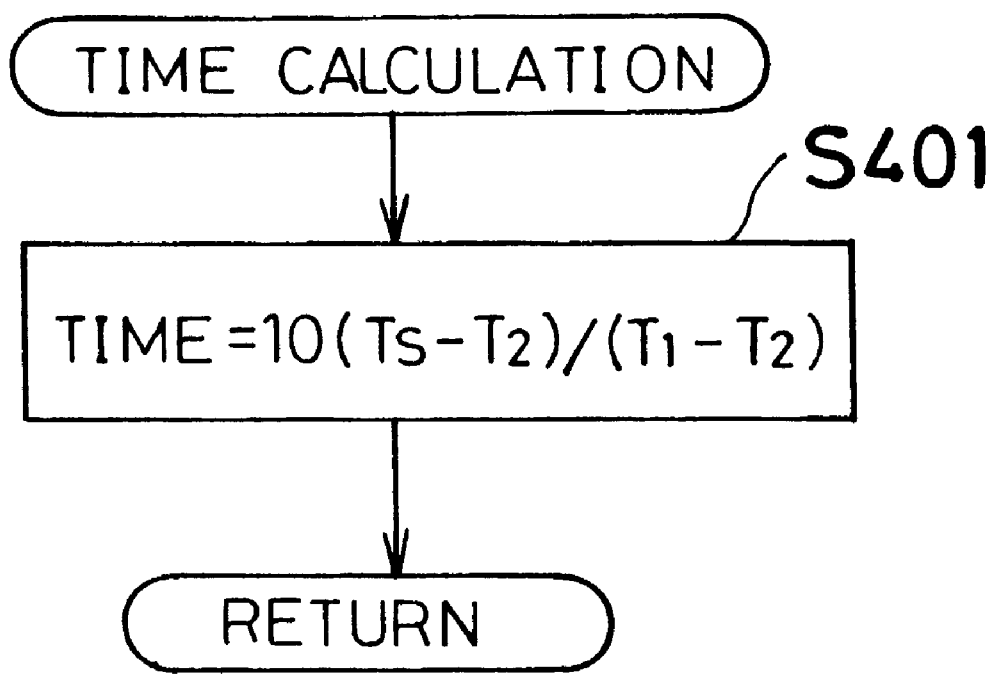
FIG. 6 illustrates a flowchart for a time calculation.

As shown in FIG. 4, during the energization control of the SR motor, the program for outputting signals to the current waveform generation circuit 9 is executed by interruption fashion. In step S201, it is checked whether or not the count value exceeds the value of TIME calculated in step S401 in FIG. 6. So long as the result of step S201 is yes, the control data CA1 (step S202) is outputted repeatedly and thereafter the control data CA2 (step S203) is outputted in repeated fashion. If the target torque Ts is 103 Nm, the control data CA1 is outputted two 2 times and subsequently the control data CA2 is outputted three times to the current waveform circuit 9 as shown in FIG. 10(*a*).

The foregoing changing manner is not restricted nature and as shown in FIG.10(*b*), outputting the control data CA1 and the control data CA2 alternately is possible, with the result that the desired target torque can be obtained.

The invention has thus been shown and described with reference to a specific embodiment, however, it should be understood that the invention is in no way limited to the details of the illustrated structures but changes and modifications may be made without departing from the scope of the appended claims.

What is claimed is:

1. An energization control device for an electric motor comprising:

detecting means for detecting an angle of rotation of a rotor of the motor;

control data storage means for storing therein a plurality of control data items corresponding to rotational conditions of the rotor; and control means for controlling the energization of the motor, the control means obtaining first control data items for deriving a first torque from the motor and second control data item for a second torque, when a target torque is intended to be derived from the motor which is smaller and larger than the first torque and the second torque, respectively, the control means, when establishing an energizafion control for deriving the target torque from the motor, using the first control data item and the second control data items in such a manner that a ratio of the second control data items to the first control data items is the ratio of a first deviation between the first torque and the target torque to a second deviation between the target torque and the second torque.

2. An energization control device for an electric motor as set forth in claim 1, wherein the first deviation and the second deviation are converted into time periods, respectively.

3. An energization control device for an electric motor as set forth in claim 1, wherein the electric motor is an SR motor.

4. An energization control device for an electric motor comprising:

a rotor angle sensor for detecting a motor rotational angle;

a current sensor for detecting a current flowing through a phase coil;

control data storage means for storing therein a plurality of control data items in map format which correspond to rotational conditions of the rotor; and control means for controlling the energization of the phase coil, the control means obtaining first control data items for deriving a first torque from the motor and second control data item for a second torque, when a target torque is intended to be derived from the motor which is smaller and larger than the first torque and the second torque, respectively, the control means, when establishing an energization control for deriving the target torque from the motor, using the first control data item and the second control data items in such a manner that a ratio of the second control data items to the first control data items is the ratio of a first deviation between the first torque and the target torque to a second deviation between the target torque and the second torque.

5. An energization control device for an electric motor as set forth in claim 4, wherein the first deviation and the second deviation are converted into time periods, respectively.

6. An energization control device for an electric motor as set forth in claim 4, wherein the electric motor is an SR motor.

* * * * *